United States Patent
Crescimanno

(10) Patent No.: US 9,481,753 B2
(45) Date of Patent: Nov. 1, 2016

(54) AQUEOUS POLYMER GRAFTED LATEX

(71) Applicant: Rohm and Haas Company, Philadelphia, PA (US)

(72) Inventor: Stephen A. Crescimanno, Hatfield, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/431,451

(22) PCT Filed: Sep. 23, 2013

(86) PCT No.: PCT/US2013/061173
§ 371 (c)(1),
(2) Date: Mar. 26, 2015

(87) PCT Pub. No.: WO2014/052233
PCT Pub. Date: Apr. 3, 2014

(65) Prior Publication Data
US 2015/0329661 A1 Nov. 19, 2015

Related U.S. Application Data

(60) Provisional application No. 61/706,920, filed on Sep. 28, 2012.

(51) Int. Cl.
*C08F 220/58* (2006.01)
*C08F 220/06* (2006.01)
*C08F 265/02* (2006.01)
*C08F 265/06* (2006.01)
*C08F 2/00* (2006.01)
*C08F 2/10* (2006.01)
*C08F 2/22* (2006.01)

(52) U.S. Cl.
CPC ............ *C08F 220/58* (2013.01); *C08F 2/001* (2013.01); *C08F 2/10* (2013.01); *C08F 2/22* (2013.01); *C08F 220/06* (2013.01); *C08F 265/02* (2013.01); *C08F 265/06* (2013.01); *C08F 2220/585* (2013.01)

(58) Field of Classification Search
CPC .. C08F 220/58; C08F 220/06; C08F 265/02; C08F 265/06; C08F 2/001; C08F 2220/585
USPC ........................ 524/555, 460; 526/201, 203
See application file for complete search history.

(56) References Cited

U.S. PATENT DOCUMENTS

| 4,565,839 A | 1/1986 | Nakayama |
|---|---|---|
| 4,876,313 A | 10/1989 | Lorah |
| 5,077,361 A | 12/1991 | Hughes et al. |
| 5,306,744 A * | 4/1994 | Wolfersberger ...... C08F 265/06 522/149 |
| 5,714,539 A | 2/1998 | Perez et al. |
| 5,858,944 A | 1/1999 | Keenan et al. |
| 6,174,953 B1 | 1/2001 | Huybrechts |
| 6,511,744 B2 | 1/2003 | Centner et al. |
| 6,852,423 B2 | 2/2005 | Schadler et al. |
| 8,013,050 B2 * | 9/2011 | Mestach ............... C08F 265/02 524/460 |
| 2009/0143528 A1 * | 6/2009 | Mestach ............... C08F 265/02 524/832 |
| 2010/0010118 A1 | 1/2010 | Bardman |
| 2010/0010143 A1 | 1/2010 | Elizalde et al. |

FOREIGN PATENT DOCUMENTS

| CN | 101381435 A | 3/2009 |
|---|---|---|
| EP | 0989163 A1 | 3/2000 |
| JP | 2000281533 A | 10/2000 |
| JP | 2002020679 A | 1/2002 |
| JP | 2002201406 A | 7/2002 |
| JP | 2002205920 A | 7/2002 |
| JP | 2004285180 A | 10/2004 |
| JP | 2007186580 A | 7/2007 |
| JP | 04062881 B2 | 3/2008 |
| WO | 2005121595 A2 | 12/2005 |

OTHER PUBLICATIONS

Ishizu et al., "Microsphere synthesis by emulsion copolymerization of methyl methacrylate with poly(methacrylic acid) macromonomers," Polymer, vol. 37, No. 13, 1996, pp. 2853-2856.
Li et al., "Spherical Polyelectrolyte Brushes on Colloidal Poly(butadiene) Particles," Z. Phys. Chem./DOI 10.1524/zpch. 20120264 by Oldenbourg Wissenschaftsverlag Muenchen, published on line Aug. 6, 2012, pp. 1-11.

* cited by examiner

*Primary Examiner* — Michael M Bernshteyn
(74) *Attorney, Agent, or Firm* — Andrew E. C. Merriam

(57) ABSTRACT

The present invention provides aqueous multistage copolymers, preferably, all acrylic and allylic or all acrylic copolymers, having as the outermost stage an acid functional, preferably, carboxyl or carboxylate functional, aqueous solution polymer and as the one or more remaining stage(s) a vinyl emulsion polymer, wherein the vinyl emulsion polymer stage(s) in the multistage copolymer comprises 5 wt. % or less of hydrophilic monomer, based on the total weight of monomers used to make the vinyl emulsion polymer stage(s). The multistage copolymer enables incorporation of a much higher amount of hydrophilic monomer into a vinyl emulsion copolymer. In addition, are methods of methods of making the multistage copolymers are provided.

11 Claims, No Drawings

AQUEOUS POLYMER GRAFTED LATEX

The present invention relates to multistage aqueous emulsion copolymers in which the outermost stage is a solution polymer and the one or more remaining stage(s) are emulsion copolymers. More particularly, it relates to aqueous emulsion copolymers having two or more stages (multistage copolymers) wherein the outermost stage comprises a solution polymer from hydrophilic monomers and wherein the solution polymer has at least one acid functional group, preferably a carboxyl or carboxylate group, and one or more inner stage is an emulsion polymer, as well as to the methods of making the same.

Attempts to make emulsion polymers containing appreciable amounts of water soluble monomers like acrylic acid or acrylamide, have led to problems with viscosity build, particle agglomeration and gel formation increase as the water soluble monomer content increases in the composition. Such problems have impeded the development of a single polymerization method of copolymers for use as rheology modifiers, thickeners, thermosetting binders, and various kinds of carboxyl group containing polymers for coating compositions, such as for leather coatings. The development of useful emulsion polymers having appreciable amounts of water soluble monomers has been slow and fitful.

U.S. Pat. No. 5,714,539, to Perez et. al., discloses a high acid polymeric surfactant prepared as a shot by aqueous polymerization methods followed by polymerization to make an emulsion polymer composition in the presence of the polymeric surfactant. No polymer stage was formed that comprises more than 65 wt. % of any hydrophilic monomer, based on the total weight of the monomer mixture in that stage. Further, Perez discloses a core-shell morphology; however, such a morphology naturally results from the combination in water of a water dispersible polymer or polymeric surfactant, which forms a shell, and an emulsion polymer, which forms a core. Perez does not disclose or show that a core polymer stage and a shell polymer stage are covalently bound to one another. Without such a covalent bond between core and shell, the viscosity build, particle agglomeration and gel formation problems posed in making emulsion polymers containing appreciable amounts of water soluble monomers will remain.

The present inventors have endeavored to solve the problem of providing an emulsion polymer that comprises a hydrophilic solution polymer stage but which avoids gel formation, particle agglomeration and handling problems in aqueous media.

STATEMENT OF THE INVENTION

In accordance with the present invention, aqueous multistage copolymers in two or more stages comprise as the outermost stage an acid functional, preferably, carboxyl or carboxylate functional, aqueous solution polymer which has, in copolymerized form, 80 wt. % or more, or, preferably, 85 wt. % or more, or, more preferably, 90 wt. % or more, of hydrophilic monomers, such as amine, hydroxyl or carboxyl groups, based on the total weight of monomers used to make the solution polymer, and, as the one or more remaining stage(s) a vinyl emulsion polymer, the vinyl emulsion polymer stage(s) preferably being all-acrylic, wherein at least 30 wt. %, preferably, 40 wt. % or more of the solution polymer is covalently attached to one or more stages of the vinyl emulsion copolymer as shown by ultrafiltration and deionization followed by titration, and, further wherein, the vinyl emulsion polymer comprises in copolymerized form, 5 wt. % or less, preferably, 3 wt. % or less, or, more preferably, 1 wt. % or less, of hydrophilic monomers, such as acrylic acid or acrylamide, based on the total weight of monomers used to make all stages of the vinyl emulsion polymer.

In accordance with the present invention, the solution polymer in the aqueous multistage copolymers of the present invention comprise from 80 to 100 wt. %, or, preferably, 85 wt. % or more, or, more preferably, 90 wt. % or more, or, even more preferably, 95 wt. % or more, of hydrophilic monomers, in (co)polymerized form, based on the total weight of monomers used to make the solution polymer. Preferably, the hydrophilic monomers used to make the solution polymer are carboxyl group containing, such as acrylic acid, methacrylic acid, itaconic acid, carboxylate group containing, such as the salts of carboxyl group containing monomers, phosphorus acid group containing, sulfur acid group containing, amide group containing, such as acrylamide, or amine group containing.

The solution polymer stage in the multistage copolymers of the present invention may comprise in copolymerized form the amount of 0.5 to 100 wt. %, based on the total weight of monomers used to make the multistage copolymer, preferably, from 1 to 95 wt. %, or, more preferably, 10 wt. % to 95 wt. %, of a carboxylic acid containing hydrophilic monomer or its salt. Preferably, such hydrophilic monomers are used when the multistage copolymers comprise the reaction residue of a relay reagent.

In the aqueous multistage copolymers of the present invention, the weight ratio of the solution polymer to the total weight of all vinyl emulsion polymer stage(s) may range from 1:99 to 99:1, or, preferably, from 1:25 to 4:1, for example, from 1:25 to 1:6, or, more preferably from 1:9 to 3:1.

Preferably, the multistage copolymer of the present invention is chosen from a copolymer in which the solution polymer comprising in copolymerized form 20 wt. % or less, or, preferably, from 0.5 to 15 wt. %, based on the total weight of monomers used to make the solution polymer, of a comonomer that is not a hydrophilic monomer and that contains a hydrophilic functional group, a copolymer containing the reaction residue of a relay reagent, described in the following paragraph. Preferably, the comonomers used to make the solution polymer include those which do not form water soluble polymer (≤20 wt. % in water). Useful comonomers may be those used in the emulsion polymer stage(s) of the multistage emulsion copolymer, preferably, alkyl acrylates and methacrylates, and vinyl aromatic monomers, such as styrene.

Preferably, the aqueous multistage copolymers of the present invention further comprise the reaction residue of a relay reagent. A suitable relay reagent has a free radical polymerizable olefin group, a coreactive functional group which reacts with the hydrophilic functional group of the aqueous solution polymer and a molecular fragment separating the olefin group and the coreactive functional group. The molecular fragment may have from 1-30 atoms excluding hydrogen and comprising carbon and/or silicon, or, preferably, 3 to 20 atoms excluding hydrogen and comprising carbon and/or silicon or, more preferably, 4-15 atoms excluding hydrogen and comprising carbon and/or silicon.

The relay reagent may be used in amounts ranging from 0.1 to 10 wt. %, or, preferably, from 0.2 to 5 wt. %, based on the total weight of monomers used to make the solution polymer.

Preferably, where the multistage copolymer comprises the reaction residue of a relay reagent, the solution polymer of the multistage copolymer has at least one carboxyl or carboxylate group.

The aqueous multistage copolymers of the present invention may further comprise the reaction residue of a Bronsted acid catalyst such as para toluene sulfonic acid, sulfuric acid, phosphoric and phosphorus acids and their salts, or Lewis acid catalysts such as, for example, ferric chloride, Zn chloride, Zn acetate and tin and titanium salts.

In another aspect of the present invention, methods of making an aqueous multistage copolymer having as the outermost stage an acid functional aqueous solution polymer and, as the one or more remaining stage(s) a vinyl emulsion polymer, the emulsion polymer stage(s) preferably being all-acrylic, comprise in an aqueous medium polymerizing or copolymerizing to form a solution polymer a monomer mixture of from 80 wt. % or more, or, preferably, 85 wt. % or more, or, more preferably, 90 wt. % or more, of hydrophilic monomers, based on the total weight of monomers used to make the solution polymer, and containing at least one unsaturated acid functional monomer, followed by polymerizing or copolymerizing in one or more stage(s) a vinyl emulsion polymer forming monomer mixture comprising 5 wt. % or less, preferably, 3 wt. % or less, or, more preferably, 1 wt. % or less, of a hydrophilic monomer, such as acrylic acid or acrylamide, based on the total weight of monomers used to make all stages of the emulsion copolymer. The method forms multistage copolymers wherein at least 30 wt. %, preferably, 40 wt. % or more of the solution polymer, based on the total weight of monomers used to make the solution polymer, is covalently attached to one or more stages of the emulsion copolymer as shown by ultrafiltration followed by titration.

Preferably, the polymerizing or copolymerizing of the monomer mixture to form the solution polymer, or at least one stage of the vinyl emulsion polymer, or both, comprises gradual addition feeding the monomer mixture into a reaction vessel.

The methods of making the aqueous multistage copolymer may further comprise reacting the solution polymer with one or more relay reagent which has a free radical polymerizable olefin group, a coreactive functional group which reacts with the hydrophilic functional group of the aqueous solution polymer and a molecular fragment separating the olefin group and the coreactive functional group, such as an allyl functional relay reagent. The molecular fragment may have from 1-30 atoms excluding hydrogen and comprising carbon and/or silicon, or, preferably, 3 to 20 atoms excluding hydrogen and comprising carbon and/or silicon atoms, or, more preferably, 4-15 atoms excluding hydrogen and comprising carbon and/or silicon atoms.

Preferably, covalent bonding between the solution polymer and one or more stage of the vinyl emulsion polymer can be controlled by methods chosen from (i) polymerizing to form the solution polymer a monomer mixture of from 0.1 to 20 wt. %, or, preferably, from 0.5 to 15 wt. %, based on the total weight of monomers used to make the solution polymer, of a comonomer that is not a hydrophilic monomer, (ii) by reacting a relay reagent with the solution polymer and (iii) combinations thereof. More preferably, where a relay reagent is reacted with the solution polymer, the methods of making the multistage copolymer comprise polymerizing at least one vinyl emulsion polymer stage containing from 0.1 to 20 wt. %, or, preferably, from 0.2 to 10 wt. %, based on the total weight of monomers used to make all stages of the vinyl emulsion polymer, of a monomer which is itself soluble ($\geq$20 wt. %) in water at room temperature but whose homopolymer is not appreciably water soluble ($\leq$20 wt. %) at room temperature, such as a hydroxyalkyl methacrylate, methacrylamide or a hydroxyalkyl methacrylamide, and combinations thereof in the presence of the modified solution polymer.

Preferably, comonomers that are not hydrophilic monomers can be included in the monomer composition used to make the solution polymer to provide water resistance and improve grafting or covalent bonding yield to the other stage(s) of the emulsion copolymer. Useful comonomers may be those used in the emulsion polymer stage(s) of the multistage emulsion copolymer, preferably, alkyl acrylates and methacrylates, and vinyl aromatic monomers, such as styrene.

Preferably, the polymerizing or copolymerizing of the monomer mixture to form the solution polymer, or at least one stage of the vinyl emulsion polymer, or both, comprises polymerizing or copolymerizing the monomer mixture in the presence of a total of 1.0 wt. % or less, or preferably, 0.3 wt. % or less based on the total weight of monomers used to make the multistage copolymer of any surfactant. For example, the polymerizing or copolymerizing can be in the presence of 0.4 wt. % or less of total anionic and/or cationic surfactants or 1 wt. % or less, or, preferably, 0.25 wt. % or less of total nonionic surfactants. More preferably, polymerizing or copolymerizing is in the presence of substantially no surfactant or 500 ppm or less, based on the total weight of monomers used to make the multistage copolymer.

Preferably, the methods of making the aqueous multistage copolymers of the present invention comprise polymerizing or copolymerizing the monomer mixture to form the solution polymer, or at least one stage of the vinyl emulsion polymer, or both, in the presence of 5 wt. % or less, based on the total weight of aqueous media, preferably, 1 wt. % or less, of total organic solvent(s).

All ranges recited are inclusive and combinable. For example, a proportion of from 80 to 100 wt. %, or, preferably, 85 wt. % or more, or, more preferably, 90 wt. % or more, or, even more preferably, 95 wt. % or more, will include ranges of 80 wt. % to 100 wt. %, from 80 wt. % to 85 wt. %, from 80 wt. % to 90 wt. %, from 80 wt. % to 95 wt. %, preferably, from 85 wt. % to 90 wt. %, preferably, from 85 to 95 wt. %, preferably, from 85 to 100 wt. %, more preferably, from 90 to 95 wt. %, more preferably, from 90 to 100 wt. % and, even more preferably, from 95 to 100 wt. %.

Unless otherwise indicated, all pressure units are standard pressure and all temperature units refer to room temperature.

All phrases comprising parenthesis denote either or both of the included parenthetical matter and its absence. For example, the phrase "(co)polymer" includes, in the alternative, polymer, copolymer and mixtures thereof. Also, the term "(meth)acrylate" means acrylate, methacrylate, and mixtures thereof and the term "(meth)acrylic" used herein means acrylic, methacrylic, and mixtures thereof.

As used herein, the term "acrylic" (co)polymer refers to polymers comprising the polymerization product of acrylate and/or methacrylate monomers or their acids or amides.

As used herein, the phrase "aqueous" includes water and mixtures comprising water and less than 50 wt. % of one or more water-miscible solvent, based on the total weight of the water and solvent.

As used herein, the phrase "based on the total weight of polymer solids" refers to weight amounts of any given ingredient in comparison to the total weight amount of all the non-water ingredients in the binder (e.g., polyacids, emulsion copolymers, polyols and the like). Binders of the present invention can be aqueous or dry (with water optionally added prior to application to a substrate).

As used herein, unless otherwise indicated, the word "copolymer" includes, independently, copolymers, terpolymers, block copolymers, segmented copolymers, graft copolymers, and any mixture or combination thereof. (Co)polymer means homopolymer or copolymer.

As used herein, the term "hydrophilic monomer" means a monomer having an affinity for water and capable of interacting with water through hydrogen bonding, which monomer is water soluble (at least 20 wt. % in water at room temperature) and its homopolymer has a water solubility of at least 20 wt. % in water at both room temperature and at 50° C. for a homopolymer of 5000 $MW_w$.

As used herein, the term "measured Tg" refers to the glass transition temperature of a sample (co)polymer as measured by differential scanning calorimetry per ASTM 3418/82 (1982), at a heating rate of 20° C./minute, taking the midpoint of the temperature plateau on the scan, with cell calibration performed using an indium reference for temperature and enthalpy.

As used herein, unless otherwise indicated, the phrase "molecular weight" or the term "average molecular weight" when referring to a polymer refers to the weight average molecular weight ($MW_w$) of a polymer as measured by gel permeation chromatography (GPC). Gel permeation chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84.

As used herein, the term "multistage" refers to a polymer having two or more stages.

As used herein, the term "ultrafiltration and deionization followed by titration" means a process herein 70 weight parts (pbw) of a polymer, such as a multistage copolymer, is diluted with deionized (DI) water to ~200 pbw, neutralized with ammonia to pH ~10 and ultrafiltered with a 2.56 cm (1 inch) Koch Hollow Fiber Membrane (HF 0.7-106-PM500, Koch Membrane Systems, USA) with a 500 K MW cutoff, connected to a peristaltic pump and reservoir and equipped with a pressure gauge and pulse damper assembly attached to tubing on the outlet side of the membrane and an adjustable flow constriction device on each of the outlet and permeate lines to provide appropriate back pressure of ~0.1-0.13 MPa (15-20 psig) on outlet and 0-0.03 MPa (0-5 psig)) on permeate lines respectively) until at least 3 bed volumes of permeate (600 pbw) are collected, then a 2.5 pbw sample of ultrafiltered multistage copolymer is diluted with 15 pbw DI water and contacted with 0.25 pbw of rinsed AMBERLITE IRN-400 (Dow Chemical, USA) anion exchange resin for 10 min; then, approximately 2 pbw of rinsed AMBERLITE IRN-77 (Dow Chemical, USA) cation exchange resin is added and mixing is continued for another 10 min and then filtered through 45 micron (325 mesh) polypropylene filter fabric and the resulting dispersion is titrated. All titrations are done potentiometrically with an AT-310 AUTOTITRATOR™ (Kyoto Electronic Manufacturing, Japan). Samples before and after ultrafiltration/deionization are measured at least in duplicate and the average (in millequivalents/g polymer) is used to calculate percentage of solution polymer covalently bound to the vinyl emulsion polymer.

As used herein, the term "wt. %" means weight percent.

The aqueous multistage copolymers of the present invention and the methods for making them provide in a single polymerization process emulsion polymers with much higher amounts of hydrophilic monomers than has previously been attainable and, in addition, provides aqueous emulsion polymers having hydrophilic group functionality in a much more available form for reaction or stabilization. The aqueous multistage copolymers can comprise a variety of self-stabilizing functionality, structure and molecular weight, thus affording more control over the polymer surface morphology than is possible in known emulsion polymerization. For this reason, the outermost stage or shell stage, which is a solution polymer, need only comprise a small portion of the multistage copolymer. Accordingly, the shell solution polymer, in part, acts as an emulsion stabilizer and enables the provision of an aqueous emulsion polymer with reduced water sensitivity because it has little or no surfactant. Because of the inherent control over the latex surface morphology in copolymers of the present invention, a wider variety of monomer composition can be prepared cleanly, with little gel formation and at high solids compared to single stage emulsion polymers of comparable overall composition or multi-stage copolymers of comparable composition wherein the solution polymer phase is polymerized last. Thus aqueous multistage copolymer of the present invention can be used in applications demanding improved flexibility or rigidity than is normally achievable by conventional single stage emulsion processing. Finally, little (less than 5 wt. % based on the total weight of the aqueous medium, preferably, 1 wt. % or less) or no organic solvent is used to make the multistage copolymers.

The multistage copolymer of the present invention can be formed via a conventional aqueous polymerization method, or via polymerization in the presence of a relay reagent which has a free radical polymerizable olefin group, a coreactive functional group which reacts with the hydrophilic functional group of the solution polymer stage of the multistage copolymer such that greater than 30 wt. % of the relay reagent, based on the total amount of relay reagent used to make the multistage copolymer forms a reaction product with the aqueous solution polymer stage in an aqueous medium, and a molecular fragment separating the olefin group and the coreactive functional group. The molecular fragment may have 1-30 atoms excluding hydrogen and comprising carbon and/or silicon, or, preferably, 3 to 20 atoms excluding hydrogen and comprising carbon and/or silicon, or, more preferably, 4-15 atoms excluding hydrogen and comprising carbon and/or silicon. As used in connection with the molecular fragment of the relay reagent of the present invention, the term "comprising" allows for other atoms such as O, N, S, etc. in the molecular fragment.

The multistage copolymer of the present invention represents a copolymerization product which is not a uniform molecule product; rather, it represents a distribution of copolymers having a range of molecular weights, compositions and morphologies. The multistage copolymerization product also varies in composition within the limits of the present invention. At least 30 wt. %, preferably, 50 wt. % or more, of the solution polymer stage is covalently bound to the vinyl emulsion polymer stage(s) in the multistage copolymer of the present invention. However, the aqueous multistage copolymer in the copolymerization product of the present invention may contain a proportion of solution polymer in the aqueous phase that is not covalently bound to the emulsion copolymer stage(s) in the disperse phase of the multistage copolymer.

In all cases, the solution polymer is formed first by polymerizing all or nearly all of the hydrophilic monomers and any comonomers, preferably, in the presence of a water soluble chain transfer agent, such as hypophosphite or its salt. Then the acid functional solution polymer is covalently attached to the emulsion polymer through emulsion polymerization of vinyl and/or acrylic monomers to form a vinyl emulsion polymer under conventional free radical polymerization conditions. If desired, additional emulsion polymer stages may then be copolymerized into the multistage copolymer.

In the methods wherein relay reagents are used, the solution polymer is reacted with the relay reagent in an aqueous medium, preferably, one having less than 10 wt. %, preferably less than 5 wt. %, of a water miscible solvent, based on the weight of the aqueous medium, to form a modified aqueous solution polymer containing at least one pendant olefin. Then the acid functional solution polymer is covalently attached to the emulsion polymer through emulsion polymerization of vinyl and/or acrylic monomers to form a vinyl emulsion polymer under conventional free radical polymerization conditions. If desired, additional emulsion polymer stages may then be copolymerized into the multistage copolymer.

Preferably, in making the solution polymer, the monomers are fed into the reaction by gradual addition, however a shot polymerization method may be used so long as sufficient chain transfer agent is included to limit molecular weight and encourage copolymer formation, for example, from 2 to 10 wt. %, based on the total weight of monomers used to make the solution polymer stage.

Because the aqueous solution polymer acts as a dispersing agent, little or no surfactant is needed in polymerization. A total of 0.4 wt. % or less, based on the total weight of monomers used to make the multistage copolymer, or, preferably, 0.3 wt. % or less of total anionic and/or cationic surfactants may be included in polymerizing or copolymerizing a monomer mixture; or a total of 1 wt. % or less, or, preferably, 0.25 wt. % or less of nonionic surfactants may be included.

Aqueous solution polymer solids in the polymerization may range from 25 to 75 wt. %, or, preferably, 30 to 60 wt. %, based on the total weight of the reaction mixture.

Polymerization temperatures may range from 25° C. to 100° C., preferably, from 70° C. to 100° C., especially when a phosphorus containing chain transfer agent is used. Cooler temperatures may be used when sulfur or nitrogen containing chain transfer agents are used.

Where no relay reagent is used in the methods of the present invention, the monomer mix used to form the solution polymer preferably comprises an acid functional hydrophilic monomer in the amount of 10 to 100 wt. %, based on the total weight of monomers used to make the solution polymer.

Relay reagents suitable for use in the present invention are dual functional compounds having a free radical polymerizable olefin and a functional group coreactive with the acid functional solution polymers, particularly in an aqueous medium. Relay reagents suitable for making multistage copolymers comprising acid functional solution polymers include those having epoxy, oxazoline and azetidinium functional groups. Examples of suitable relay reagents include allyl glycidyl ether, the Michael reaction product of an allyl acetoacetonate or allyl cyanoacetate with glycidyl methacrylate, oxazoline functional olefins such as allyloxybenzyl oxazoline or isopropenyl oxazoline, crotonic esters such as glycidyl crotonate or the monoadduct reaction product of crotonic acid with a diepoxide (for example, resorcinol diglycidyl ether or bisphenol A diglycidyl ether).

Relay reagents may be made specific to the functionality of the solution polymer. For example, for carboxylic acid functional solution polymer, relay reagents bearing epoxy, oxazoline and azetidinium coreactive functional groups are suitable. Likewise, for primary amine containing solution polymers, relay reagents bearing epoxy, isocyanato, anhydride, lactone, halide and aldehyde functionality are suitable.

The proportion of solution polymer covalently bound to a vinyl emulsion polymer stage may be controlled by proper selection of the relay reagent. Preferred relay reagents react preferentially with solution polymer in water to form a macromonomer and do not homopolymerize in the solution phase during subsequent emulsion polymerization steps. Further, preferred relay reagents improve the affinity of the solution polymer for the surface of the emulsion polymer. Such relay reagents have molecular fragments between olefin and coreactive functional groups of at least 3 carbon and/or silicon atoms, excluding hydrogen, or, more preferably, at least 4 carbon and/or silicon atoms, excluding hydrogen. More preferably, the relay reagent comprises an allyl or crotonic ester group.

Hydrophilic monomers suitable for use in making the solution polymer of the present invention are those whose homopolymer is water soluble (defined as having a water solubility of at least 20 wt. % at both room temperature and at 50° C. for a homopolymer of 5000 $MW_w$). Suitable hydrophilic monomers include unsaturated strong acid group containing monomers, such as 2-acrylamido 2-methyl-1-propane sulfonic acid (AMPS) and phosphorus acid group containing monomers, for example, phosphoalkyl (meth)acrylates, unsaturated carboxyl or carboxylate group containing monomers, such as acrylic, methacrylic acid and itaconic acid, unsaturated hydroxyl or amide containing monomers, such as hydroxyethyl acrylate, acrylamide and n-vinyl pyrrolidinone and unsaturated amine containing monomers such as methacryloxyethyl trimethylammonium chloride (MAPTAC) and aminoethyl acrylates.

Each stage, and preferably all stages, of the vinyl emulsion polymer of the aqueous multistage copolymer of the present invention may be polymerized from any suitable ethylenically unsaturated monomer, such as vinylic, allylic, arylenic or acrylic monomers, such as acrylic ester monomers, e.g. any of one or more $C_1$ to $C_{20}$ alkyl or $C_5$ to $C_{20}$ cycloalkyl or $C_5$ to $C_{20}$ aryl (meth)acrylates; (meth)acrylonitrile; styrene, in the presence of the solution polymer stage. Preferably, the emulsion polymer stage(s) are all acrylic and allylic or all acrylic.

Suitable acrylic ester monomers include, for example, methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; suitable methacrylamide monomers may include methacrylamide or substituted methacrylamides; suitable arylene monomers may include styrene or alkyl substituted styrenes; butadienes; vinyl acetate or other vinyl esters; acrylonitrile or methacrylonitrile; and the like.

Low levels of multi-ethylenically-unsaturated monomers can be used in order to produce low levels of pre-crosslinking in emulsion polymer stage(s). These may include, for example, allyl methacrylate, diallyl phthalate, 1,4-butylene glycol dimethacrylate, 1,6-hexanedioldiacrylate, and the like. In those embodiments of the invention where the multi-ethylenically-unsaturated monomers are used, it is preferred that they be used as a level of from 0.01 to 5 wt. %, based on the total weight of monomers used to make the total emulsion polymer stage(s).

The one or more emulsion polymer stage(s) of the multistage copolymer of the present invention are formed by conventional emulsion polymerization of the monomers in the presence of the solution polymer stage.

Suitable chain transfer agents useful during the polymerization of any stage of the multistage copolymers of the present invention may include conventional chain transfer agents, such as, but are not limited to, mercaptans such as 2-mercaptoethanol and 3-mercaptopropionic acid, hypophosphites, isoascorbic acid, alcohols, aldehydes, hydrosulfites and bisulfites. Preferred as chain regulators or chain-transfer agents are hypophosphites and bisulfites, such as sodium metabisulfite.

The aqueous multistage copolymers of the present invention may further comprise in conventional amounts one or more of any of pigments or colorants; extenders; flatting agents; neutralizing agents, such as ammonia; antioxidants, such as benzophenone; polyols; coupling agents, such as silanes, like an alkoxysilyl (meth)acrylate, or one that has been hydrolyzed with a weak organic acid; rheology modifiers; superplasticizers; redispersible polymer powders; dispersants; and tackifiers.

The aqueous multistage copolymers of the present invention may find use in applications where it is desirable to have emulsion polymers with high surface hydrophilicity, e.g. thermosettable binders; coatings, such as leather coatings, paper coatings, or metal coatings; and thickeners.

EXAMPLES

Comparative Example 1

Single Stage High Acid Emulsion Copolymer

An emulsion copolymer having 30 wt. % of an acid functional monomer (acrylic acid) was made, as follows:

To a stirred solution of 36.77 grams deionized (DI) water, 1.56 grams of a 30% (w/w) solution of sodium lauryl ether sulfate (DISPONIL™ FES-993, Cognis Corporation, Cincinnati, Ohio), 1.54 grams of phosphorus-based chain transfer agent (sodium hypophosphite monohydrate, 100% solids) and 0.34 grams of sodium hydroxide solution (50% w/w in $H_2O$) at 85° C. is added 4.09 g of a monomer mix consisting of 29.15 grams acrylic acid (AA), 44.45 grams butyl acrylate (BA) and 23.56 grams methyl methacrylate (MMA) and an initiator solution consisting of 0.41 grams ammonium persulfate (APS, 100% solids) in 1.75 grams DI water. After exotherm peak, the remaining monomer mix and an initiator/soap solution consisting of 0.41 grams APS, 4.88 grams of DISPONIL™ FES-993 (Cognis Corp) and 24 grams DI water were simultaneously added over a period of 2 hours at 85° C.

The batch began to form gel on thermocouple roughly 10 minutes into feeds. After 40 minutes, visible sludge was evident in the solution. After 1 hr of feeds, sludge formation worsens along with a significant increase in batch viscosity and was discarded after an additional 15 minutes due to severe flocculation.

Comparative Example 1A

Multistage Copolymer Wherein Vinyl Emulsion Polymer Stage Is Polymerized First

A multistage emulsion copolymer having 20 wt. %, based on the weight of monomers used to make the copolymer, of an acid functional monomer (acrylic acid) in copolymerized form was made by adding to a stirred solution of 35.0 g deionized (DI) water and 0.09 g sodium lauryl sulfate (SLS) at 85° C. a solution of 0.21 g APS in 0.5 g DI water. Then a monomer emulsion consisting of 17.8 g DI water, 0.64 g SLS, 25.6 g BA monomer and 17.5 g MMA monomer was gradually added along with a solution consisting of 0.3 g APS in 1.26 g DI water over 2 hrs. Upon completion of the feeds, 42 g DI water was added and the batch temperature was adjusted to 75° C. A monomer chase solution of $FeSO_4$ heptahydrate and ethylenediaminetetraacetic acid (EDTA) in DI water was added and then a solution of aqueous tert-butyl hydroperoxide (t-BHP) in DI water (70%) and a solution of isoascorbic acid in DI water were added immediately to the reactor. The batch was held at 75° C. for 20 minutes and then the temperature was adjusted to 80° C. A second stage monomer mixture consisting of 10.5 g acrylic acid (AA), a catalyst solution consisting of 0.21 g ammonium persulfate (APS) and 1.23 g DI water and a solution consisting of 1.1 g sodium bisulfite (NaBS) in 5 g DI water were simultaneously gradually added over a 60 minute period. After completion of feeds, the reactor contents were held at temperature for an additional 10 minutes and then cooled to 75° C. A solution of aqueous tert-butyl hydroperoxide (t-BHP) in DI water (70%) and a solution of isoascorbic acid in DI Water were added immediately to the reactor and the batch was held an additional 20 minutes at 75° C. The batch was cooled and packed out.

The batch began to form gel on thermocouple and stirrer shaft upon the start of the second stage and the gel problem worsened throughout the remainder of feeds. Final gel measured ~11 g (including the gel formed on stirrer and shaft) or ~70 g/L. The high gel content occurred despite the comparatively low in-process solids used in comparative Example 1A. The final polymer solids was 30.6 wt. %.

Example 1A

Multistage Copolymer with No Relay Reagent

To a stirred solution of 804.0 g deionized (DI) water at 80° C. was gradually added over a 60 minute period a monomer mixture of 305.0 g acrylic acid (AA), a catalyst solution consisting of 6.0 g ammonium persulfate (APS) and 4.1 g sodium hydroxide (NaOH) solution (50% w/w) in 34.8 g DI water and a solution of 32.0 g sodium bisulfite (NaBS) in 48 g DI water. The resulting mixture was held at temperature for an additional 30 minutes. Hydrogen peroxide (2.1 g) was added and the solution was held at temperature for an additional 5 min and the temperature was adjusted to 85° C. A solution of 6.0 g APS in 11.5 g DI water was added and then a monomer emulsion consisting of 504.6 g DI water, 18.1 g sodium lauryl sulfate surfactant (SLS), 725.7 g BA and 494.6 g MMA was gradually added along with a solution consisting of 8.36 g APS in 35.6 g DI water over 2 hrs. Upon completion of the feeds, 254.6 g DI water was added as the batch cooled to 75° C. A monomer chase solution of $FeSO_4$ heptahydrate and ethylenediaminetetraacetic acid (EDTA) in DI water was added and then a solution of aqueous tert-butyl hydroperoxide (t-BHP) in DI water (70%) and a solution of sodium sulfoxylate formaldehyde (SSF) in DI Water were simultaneously added to the reactor over time. The batch was cooled and packed out. The sample was low in viscosity and filtered easily through a 45 μm filter. The batch was low in gel with a particle size of 231 nm and a final solids of 46.2%. The percent solution polymer covalently bound to the latex emulsion was 54% by titration.

Example 1

Multistage Copolymer with Relay Reagent

To a stirred solution A (heel) comprising water and SHP at 95° C. as indicated in Table 1, below, was gradually added over 60 minutes time a monomer mix B. consisting of AA and other monomers, as indicated in Table 1, below and a catalyst solution C., as indicated in Table 1, below, consisting of APS and NaOH (50% w/w) in DI water and a solution consisting of sodium hypophosphite (SHP) in DI water. After the end of feeds, the mixture was held at constant temperature for an additional 30 minutes. Dilution water D., as indicated in Table 1, below, was added and the temperature adjusted to 80° C. The indicated amount of a relay reagent in E. In Table 2, below, including allyl glycidyl ether (AGE) and of SLS was added to the mixture and the mixture was stirred for an additional 30 minutes adjusting temperature to 85° C. at the end of the hold. A solution F. indicated in Table 1, below, of APS in DI water was added and then a monomer emulsion G. including DI water, SLS, and monomers, as indicated in Table 1, below, was gradually added over 2 hours along with a solution H., as indicated in Table 1, below, consisting of APS in DI water. Upon completion of the feeds, the batch was cooled to 75° C. A solution of $FeSO_4$ heptahydrate and EDTA in DI Water was added and then a solution of aqueous tert-butyl hydroperoxide (TBHP) (70% w/w) in DI Water and a solution of SSF in DI water were simultaneously metered into the reactor. The batch was cooled and packed out. The sample was low in viscosity and filtered easily through 45 micron filter. The batch was low in gel (<0.1 g/qt) with a particle size of 225 nm and a final solids of 46.3%.

Examples 2-5

The multistage copolymers of Examples 2 to 5 were made in the same manner as the Example 1 multistage copolymer with relay reagent, with the amounts of respective materials indicated in Table 1, below.

In Table 1, below, IA is itaconic acid, BA is butyl acrylate, AM is acrylamide, and AMPS is 2-acrylamido 2-methyl-1-propane sulfonic acid.

TABLE 1

Multistage Copolymer Polymerization Feeds

| | Example | | | | |
|---|---|---|---|---|---|
| | 1 | 2 | 3 | 4 | 5 |
| A. DI. Water | 829 | 120.3 | 615.4 | 554.4 | 34.6 |
| SHP | 3.45 | 0 | 3.45 | 3.45 | 0.58 |
| IA | 0 | 75.4 | 0 | 0 | 0 |
| B. Solution Polymer Feed | | | | | |
| DI Water | 0 | 0 | 213.6 | 0 | 0 |
| AA | 289.8 | 32.3 | 91.5 | 30.5 | 36.73 |
| BA | 15.3 | 0 | 0 | 0 | 1.93 |
| AM (100%) | 0 | 0 | 213.6 | 0 | 0 |
| AMPS (50%) | 0 | 0 | 0 | 549.2 | 0 |
| C. | | | | | |
| APS | 6.0 | 2.7 | 6.0 | 6.0 | 0.82 |
| NaOH(50% w/w) | 4.07 | 1.75 | 4.07 | 4.07 | 0.55 |
| SHP | 6.89 | 0.45 | 6.89 | 6.89 | 1.17 |
| D. | | | | | |
| DI Water | 0 | 153 | 0 | 0 | 15.86 |
| E. Relay Reagent | | | | | |
| AGE | 14.75 | 5.7 | 14.75 | 14.75 | 2.05 |
| SLS | 0 | 10.9 | 0 | 0 | 0 |
| F. | | | | | |
| APS | 6.0 | 1.8 | 6.0 | 6.0 | 0.13 |
| DI Water | 11.5 | 3.45 | 11.5 | 11.5 | 0.25 |
| G. Vinyl Emulsion Polymer | | | | | |
| DI Water | 504.6 | 152.7 | 504.6 | 504.6 | 10.65 |
| SLS | 18.1 | 5.5 | 18.1 | 18.1 | 0.38 |
| BA | 725.7 | 15.8 | 725.7 | 725.7 | 15.33 |
| Sty | 494.6 | 0.00 | 0 | 0 | 0 |
| MMA | 0 | 380.0 | 494.6 | 494.6 | 10.45 |
| H. | | | | | |
| APS | 8.36 | 2.5 | 8.36 | 8.36 | 0.18 |
| DI Water | 35.6 | 10.6 | 35.6 | 35.6 | 0.77 |

TABLE 2

Covalent Bonding Of Solution Polymer And Vinyl Emulsion Polymer

| | Example | | | | |
|---|---|---|---|---|---|
| | 1 | 2 | 3 | 4 | 5 |
| % bound | 60% | 64% | 76% | 40% | 55% |

As shown in Table 2, above, and in Example 1A, above, a multistage copolymer either with a relay reagent and without a relay reagent is formed in accordance with the present invention so that more than 30 wt. % of the solution polymer stage is covalently bound in the formation of the latex copolymer. The multistage copolymers made in the Examples include those having itaconic acid (Example 2), acrylamide (Example 3) and sulfonic acid groups (Example 4) as the hydrophilic monomer. In contrast, Comparative Example 1 in an attempt to incorporate 30 wt. % acrylic acid monomer, based on the total weight of monomers used to make the total polymer, into a single stage polymer failed to give a workable product and gelled before the reaction was completed.

I claim:
1. An aqueous multistage copolymer in two or more stages comprising as an outermost stage an acid functional aqueous solution polymer having, in copolymerized form, 80 wt. % or more of hydrophilic monomers, based on the total weight of monomers used to make the solution polymer, and, as the one or more remaining stage(s) a vinyl emulsion polymer, wherein at least 30 wt. % of the solution polymer is covalently attached to one or more stages of the vinyl emulsion copolymer, and wherein, the vinyl emulsion polymer comprises in copolymerized form, 5 wt. % or less of hydrophilic monomer, based on the total weight of monomers used to make all stages of the vinyl emulsion copolymer.

2. The aqueous multistage copolymer as claimed in claim 1, wherein the aqueous solution polymer has, in copolymerized form, 85 wt. % or more of hydrophilic monomers.

3. The aqueous multistage copolymer as claimed in claim 2, wherein the hydrophilic monomer is selected from the group consisting of carboxyl group containing, carboxylate group containing, phosphorus acid group containing, sulfur acid group containing, amide group containing, hydroxyl group containing and amine group containing monomers.

4. The aqueous multistage copolymer as claimed in claim 1, wherein at least 40 wt. % of the solution polymer is covalently attached to one or more stages of the emulsion copolymer as shown by ultrafiltration followed by titration.

5. The aqueous multistage copolymer as claimed in claim 1, wherein the proportion of the solution polymer covalently attached to one or more stages of the vinyl emulsion copolymer is controlled by having (i) the solution polymer comprise in copolymerized form 20 wt. % or less, based on the total weight of monomers used to make the solution polymer, of a comonomer that is not a hydrophilic monomer, (ii) the solution copolymer contain the reaction residue of a relay reagent which has a free radical polymerizable olefin group, a coreactive functional group which reacts with the hydrophilic functional group of the solution polymer and a molecular fragment separating the olefin group and the coreactive functional group having 1-30 atoms excluding hydrogen comprising carbon and/or silicon, or (iii) combinations thereof.

6. The aqueous multistage copolymer as claimed in claim 1 wherein the solution polymer comprises, in (co)polymerized form, from 80 to 100 wt. % of hydrophilic monomers, based on the total weight of monomers used to make the solution polymer.

7. The aqueous multistage copolymer as claimed in claim 1, wherein the weight ratio of the solution polymer to the total weight of all vinyl emulsion polymer stage(s) ranges from 1:99 to 3:1.

8. A method of making an aqueous multistage copolymer having as the outermost stage an acid functional aqueous solution polymer and, as the one or more remaining stage(s) a vinyl emulsion polymer, comprise in an aqueous medium polymerizing or copolymerizing to form a solution polymer a monomer mixture of from 80 wt. % or more, of one or more hydrophilic monomers, based on the total weight of monomers used to make the solution polymer, and at least one unsaturated acid functional monomer, followed by polymerizing or copolymerizing in one or more stage(s) a vinyl emulsion polymer forming monomer mixture comprising 5 wt. % or less of a hydrophilic monomer, based on the total weight of monomers used to make all stages of the emulsion copolymer, wherein at least 30 wt. % of the solution polymer, based on the total weight of monomers used to make the solution polymer, is covalently attached to one or more stages of the emulsion copolymer.

9. The method as claimed in claim 8, wherein the polymerizing or copolymerizing of the monomer mixture to form the solution polymer, or at least one stage of the vinyl emulsion polymer, or both, comprises gradual addition feeding the monomer mixture into a reaction vessel.

10. The method as claimed in claim 8, further comprising increasing the covalent bonding between the solution polymer and one or more stage of the vinyl emulsion polymer by (i) reacting the solution polymer with one or more relay reagent which has a free radical polymerizable olefin group, a coreactive functional group which reacts with the hydrophilic functional group of the aqueous solution polymer and a molecular fragment, (ii) polymerizing or copolymerizing in the monomer mixture to form the solution polymer 20 wt. % or less, based on the total weight of monomers used to make the solution polymer, of a comonomer that is not a hydrophilic monomer, (iii) and combinations thereof.

11. The method as claimed in claim 8, wherein the polymerizing or copolymerizing the monomer mixture to form the solution polymer, or at least one stage of the vinyl emulsion polymer, or both, is carried out in the presence of 5 wt. % or less, based on the total weight of aqueous media, of total organic solvent(s).

* * * * *